United States Patent [19]

Beer

[11] 3,774,246
[45] Nov. 27, 1973

[54] APPARATUS FOR ELECTROLYZING TAP WATER TO PROVIDE STERILIZING SOLUTION

[76] Inventor: Henri Bernard Beer, 36 Boswachtersdreef, Heide-Kalmthout, Belgium

[22] Filed: Nov. 16, 1971

[21] Appl. No.: 199,371

Related U.S. Application Data

[63] Continuation-in-part of Ser. No. 6,225, Jan. 27, 1970, abandoned.

[30] Foreign Application Priority Data
Jan. 28, 1969 Great Britain............... 4,649/69
Feb. 27, 1969 Great Britain............. 10,627/69

[52] U.S. Cl.............. 4/228, 204/149, 204/228, 204/275, 204/DIG. 8, 4/226
[51] Int. Cl............................................. E03d 9/02
[58] Field of Search............... 204/149, 260, 272, 204/275, DIG. 8, 228; 4/226, 228

[56] References Cited
UNITED STATES PATENTS
2,741,586  4/1956  Sherwood .................... 204/228
3,458,415  7/1969  Hughes et al. ................ 204/149
3,476,675  11/1969 Colvin et al. ................. 204/149
3,479,275  11/1969 Gwynn et al. ................ 204/275
3,481,857  12/1969 Gray ........................... 204/272

Primary Examiner—John H. Mack
Assistant Examiner—W. I. Solomon
Attorney—E. F. Wenderoth et al.

[57] ABSTRACT

An apparatus for providing an aqueous sterilizing and deodorizing solution to equipment which is to be kept sanitary. The apparatus has means for confining a supply of tap water, said means having a tap water inlet and a solution outlet adapted to be connected to the equipment to be kept sanitary. An electrolytic cell is positioned in said confining means and has a cathode and an anode spaced from said cathode which is of a material substantially resistant to chlorine and oxygen. Current supply means supplies a D.C. current to said cell in such a way that a small reverse current flows in the cell so as to periodically make the cathode slightly anodic. This prevents buildup of calcium deposits on the cathode.

1 Claim, 2 Drawing Figures

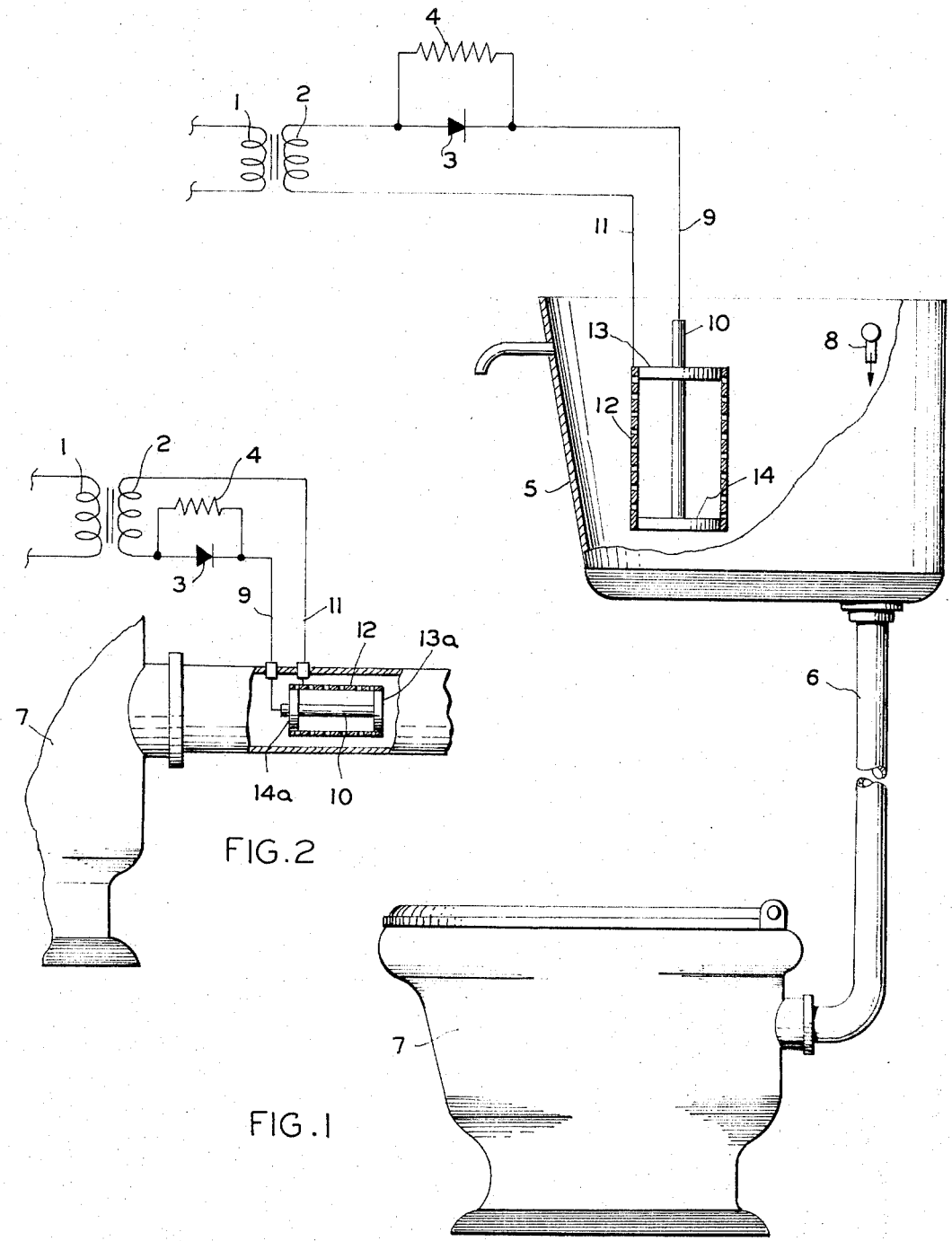

APPARATUS FOR ELECTROLYZING TAP WATER TO PROVIDE STERILIZING SOLUTION

This application is a continuation-in-part of Application Ser. No. 6,225 filed Jan. 27, 1970 and now abandoned.

This invention relates to an apparatus for making aqueous sterilizing solutions by means of electrolysis, particularly water sterilizing solutions for domestic purposes. Water solutions made in accordance with the present invention are particularly useful for cleaning and disinfecting apparatus which must be kept sanitary and preventing offensive odors.

Aqueous sterilizing solution made by the use of chemicals such as chlorine, oxygen compounds, etc., are well-known, but such materials must be added to the water in accurate dosages. Methods of producing sterilizing fluids by the electrolysis of water to which the necessary chemicals, such as sodium chloride, potassium chloride, etc. have been added, are also known, the fluids being bottled and sold for the purpose.

These known methods have many disadvantages however. For one thing, they must be used over and over again in a discontinuous manner. For another, fresh chemicals must be used, and they must be carefully measured to avoid risks to persons or the apparatus. Also, the use of the chemicals per se constitutes a hazard in that damage may be caused to the skin or the eyes of the user due to splashing.

The present invention is based on the novel concept that normal tap water can be made suitable for cleaning disinfecting and deodorizing purposes, i.e. for rendering equipment which must be kept sanitary clean and sterile, and free of offensive odors without the addition of any chemicals, if the water is electrolyzed by means of suitable electrolysis equipment incorporated in the apparatus. The invention is, accordingly, of special interest for use in sterilizing, deodorizing and cleaning apparatus such as water-closets, urinals, baths, swimming pools, etc., but is not limited to these uses.

The invention provides a water supply system for use in the apparatus which must be kept sanitary, which water supply system is provided with a device for producing an aqueous sterilizing solution from the tap water therein without the addition of chemicals to the water. This device comprises an electrolytic cell having a cathode and an anode substantially resistant to chlorine and oxygen.

Normal tap water has very few ions therein, and thus has a relatively high ohmic resistance. Therefore, in order that the current density be sufficient for generating adequate quantities of disinfectants such as chlorine and/or oxygen, the potential difference between the anode and the cathode must be far in excess of that commonly employed in an electrolysis cell for producing chlorine or oxygen. Consequently, a great many meterials, such as graphite, iron, lead, etc., are unsuitable for use as an anode because they would be corroded at such a fast rate that they would be consumed after a short time, rendering the apparatus ineffective.

Preferably, the material selected for the anode is such as to exhibit no substantial damage at a cell voltage of 4-25 volts in an electrolyte, such as tap water having chlorine ions therein, in which chlorine and oxygen are generated at the anode. Suitable anodes are made of a base material such as titanium, tantalum, zirconium, and niobium coated with a material which, under anodic conditions, continues to conduct the current, such as metals of the platinum group, lead peroxide, lead peroxide in admixture with silver oxide, manganese dioxide, oxides of the metals of the platinum group, and so-called mixed oxides, i.e. a material which is a mixed crystal of a metal oxide of a platinum group metal and another metal oxide.

Since normal tap water usually contains calcium compounds, which under the electrolytic conditions are deposited on the cathode on which they can be accum-ulated to such a thickness as to substantially inhibit the passage of current, the construction and/or material of the cathode is also quite critical. According to the invention, the cathode is either of such a material that practically no calcium can be deposited on it, or of such construction that the calcium comes off when it has reached a certain thickness.

The deposition of calcium compounds on the cathode which would interfere with the proper operation of the apparatus can be prevented, for example by:

1. Preparing the surfaces of the cathode such that the calcium compounds cannot adhere to them. This can be effected, for example, by polishing the surfaces or by treating the surfaces with silicones, fats, or graphite, providing them with oxide coatings, chromium plating, etc.

2. Using highly perforated metal pig iron or metal gauze for the cathode.

3. So positioning the apparatus according to the invention that the deposits are removed by the water flowing along the cathode.

4. Supplying half-wave incompletely rectified A.C. current to the electrodes of the apparatus.

5. A combination of two or more steps.

In view of the high ohmic resistance of tap water, the spacing between the cathode and the anode should be no more than 50 mm.

The invention will be further described with reference to the accompanying drawing, in which:

FIG. 1 is a diagrammatic view of one embodiment of the apparatus according to the invention; and FIG. 2 is a diagrammatic view of a second embodiment of the apparatus according to the invention.

In FIG. 1, an A.C. transformer has a primary winding 1 adapted to be coupled to a power supply, and a secondary winding 2 capable of supplying a current of 1–3 amps at 6–14 volts. A half wave rectifier 3 is connected between one end of the secondary winding 2 by a conductor 9, and supplies a pulsating direct current from the transformer to the anode. The rectifier 3 is shunted by a resistance 4, the resistance of which in comparison to the resistance of the rectifier 3 to the flow of current in the forward direction is quite high. It should be sufficiently high that only a small reverse current, as compared to the average value of the pulsating direct current, flows through the anode 10 during alternate half cycles of the current. The small reverse current should be no more than 25 percent of the forward direct current. For a rectifier resistance of 1 ohms a shunt resistance of 5 ohms is satisfactory. The other end of the winding 2 is connected to a cathode 12. During the small reverse current flow in this circuit, the cathode becomes slightly anodic, thereby preventing buildup of calcium deposits thereon without otherwise affecting the operation of the apparatus. Alternatively, direct current can also be supplied directly to the device, but experiments have shown that pulsating direct current produced by half-wave rectification, with the rectifier being shunted by resistance 4, also substantially prevents deposition of calcium compounds.

A flush tank 5 is connected through a pipe 6 to a toilet 7. Fresh tap water is supplied to the tank 5 at 8. For the sake of clarity, the conventional float is not shown, since it is irrelevant to the present invention.

The electric current is supplied through the conductor 9 to the anode 10, which is constituted by a titanium rod coated with an extremely thin layer of platinum or other conductor. In the embodiment shown, the anode is disposed co-axially within a cylindrical cathode 12 of perforated iron, treated with a solution of silicones to prevent deposition of calcium compounds thereon. Alternatively, the anode can be placed around the cathode. In that case, it is the anode which would be perforated to promote free circulation of water between the anode and the cathode. The negative current is supplied to cathode 12 through conductor 11.

Of course, the anode and cathode can have any desired form.

The distance between the anode and the cathode is preferably 15 mm, and is no more than 50 mm, which is maintained by means of insulating discs 13 and 14, made of rubber, plastic or the like electrically insulating material.

In operation, the gases generated at the electrodes 10 and 12 agitate the liquid between the electrodes, and mix it with the rest of the water in the tank. By this action, fresh tap water which contains ions, preferably chlorine ions, in a small amount, is supplied to the space between the electrodes.

Experiments in various places in Holland and Europe have shown that the described device, placed in a tank filled with normal tap water which contains a small amount of sodium chloride, produces chlorine and/or oxygen, from which a disinfecting fluid is formed in the cistern due to a reaction with the catholyte. Toilets used by many people were kept entirely free from infectious substances, deposits and offensive odors, and required no cleaning or treatment by other means.

The described device has the great advantage that it requires no maintenance and attention and no chemicals, and that it is extremely economical. When the anode and cathode and the spacing between the electrodes are properly selected, the consumption of electrical energy is extremely low. As a matter of fact, when a certain quantity of hypochlorite has been formed, and this can be adjusted by controlling the current flow, the potential difference between the electrodes becomes so high that the current consumption is practically reduced to zero.

As for the construction per se, the tank can be grounded, if so desired. If the tank is made of metal, it can be used as part of the cathode, and will then be cathodically protected.

Furthermore, the described device is provided with fixtures (not shown) for attachment to the tank.

If a toilet is not equipped with a tank, the tap water can be treated for the purpose described while it is in the supply pipe, by placing the described device in the pipe. Such an embodiment is shown in FIG. 2 in which like reference numbers designate like parts. The insulating discs 13 and 14 are replaced by perforated discs 13a and 14a to permit flow of water. In this embodiment, the flow of the liquid along the cathode 12 will remove the calcium deposits therefrom.

It will be understood that the structural embodiments of the basic principles of the invention allow of countless variations and modifications that can be made without departing from the scope of the invention as defined by the appended claims.

What is claimed is:

1. An apparatus for providing an aqueous sterilizing and deodorizing solution for a toilet which is to be kept sanitary, said apparatus comprising a toilet flush tank for confining a supply of tap water, said tank having a tap water inlet and a solution outlet adapted to be connected to the toilet, an electrolytic cell in said tank and comprising two electrodes, one of which is a perforated electrode, said electrodes being a cathode and an anode spaced from said cathode, said anode being of a material substantially resistant to chlorine and oxygen, and current supply means for supplying a current to said cell, said current supply means comprising a source of alternating current coupled across said anode and said cathode, a half wave rectifier means connected in series with said source and one of said cathode and said anode, and a shunt resisotr having a resistance at least four times the resistance of the rectifying means in the conducting direction and connected in parallel with said rectifier means, whereby when the current is reversed from the conducting direction of the rectifying means, a current no more than 25 percent of the current in the conducting direction of the rectifying means flows through thp cathode in the reverse direction making the cathode anodic and helps prevent scale formation on the cathode.

* * * * *